(12) United States Patent
Zhao et al.

(10) Patent No.: US 11,383,238 B2
(45) Date of Patent: Jul. 12, 2022

(54) MICROFLUIDIC APPARATUS, AND METHOD OF DETECTING SUBSTANCE USING MICROFLUIDIC APPARATUS

(71) Applicants: BEIJING BOE OPTOELECTRONICS TECHNOLOGY CO., LTD., Beijing (CN); BOE Technology Group Co., Ltd., Beijing (CN)

(72) Inventors: Nan Zhao, Beijing (CN); Peizhi Cai, Beijing (CN); Haochen Cui, Beijing (CN); Yuelei Xiao, Beijing (CN); Fengchun Pang, Beijing (CN); Le Gu, Beijing (CN); Yingying Zhao, Beijing (CN); Hui Liao, Beijing (CN); Yue Geng, Beijing (CN); Wenliang Yao, Beijing (CN)

(73) Assignees: BEIJING BOE OPTOELECTRONICS TECHNOLOGY CO., LTD., Beijing (CN); BOE Technology Group Co., Ltd., Beijing (CN)

( * ) Notice: Subject to any disclaimer, the term of this patent is extended or adjusted under 35 U.S.C. 154(b) by 383 days.

(21) Appl. No.: 16/626,490

(22) PCT Filed: Jul. 26, 2019

(86) PCT No.: PCT/CN2019/097908
§ 371 (c)(1),
(2) Date: Dec. 24, 2019

(87) PCT Pub. No.: WO2020/029813
PCT Pub. Date: Feb. 13, 2020

(65) Prior Publication Data
US 2021/0331162 A1     Oct. 28, 2021

(30) Foreign Application Priority Data

Aug. 6, 2018   (CN) .......................... 201810886760.5

(51) Int. Cl.
*G01N 21/00*    (2006.01)
*B01L 3/00*     (2006.01)
(Continued)

(52) U.S. Cl.
CPC ........ *B01L 3/502715* (2013.01); *G01N 21/05* (2013.01); *G01N 21/59* (2013.01);
(Continued)

(58) Field of Classification Search
CPC .. G01N 21/253; G01N 21/0303; G01N 21/05; G01N 21/03; G01N 30/74
(Continued)

(56) References Cited

U.S. PATENT DOCUMENTS 4,603,356 A      7/1986  Bates
2012/0142018 A1  6/2012  Jiang
(Continued)

FOREIGN PATENT DOCUMENTS

CN    102539333 A    7/2012
CN    104238223 A    12/2014
(Continued)

OTHER PUBLICATIONS

First Office Action in the Chinese Patent Application No. 201810886760.5 dated Jun. 28, 2020; English translation attached.
(Continued)

*Primary Examiner* — Md M Rahman
(74) *Attorney, Agent, or Firm* — Intellectual Valley Law, P.C.

(57) ABSTRACT

A microfluidic apparatus is provided. The microfluidic apparatus includes an electrochromic layer including a plurality
(Continued)

of individually independently addressable regions; a microfluidic layer defining a microfluidic channel for allowing a microfluid to pass therethrough; and a plurality of photodetectors configured to detect light transmit through the microfluid. The electrochromic layer is configured to be switched between a first state in which the plurality of individually independently addressable regions of the electrochromic layer are substantially transmissive, and a second state in which at least a first one of the plurality of individually independently addressable regions of the electrochromic layer in a region corresponding to a position of the microfluid is substantially transmissive, at least a second one of the plurality of individually independently addressable regions of the electrochromic layer outside the region corresponding to the position of the microfluid is substantially non-transmissive.

20 Claims, 9 Drawing Sheets

(51) Int. Cl.
*G01N 21/05* (2006.01)
*G01N 21/59* (2006.01)

(52) U.S. Cl.
CPC ............ *B01L 2300/0636* (2013.01); *B01L 2300/0645* (2013.01); *B01L 2300/0654* (2013.01); *B01L 2300/168* (2013.01)

(58) Field of Classification Search
USPC ........................................................ 356/440
See application file for complete search history.

(56) References Cited

U.S. PATENT DOCUMENTS

| | | |
|---|---|---|
| 2016/0273032 A1 | 9/2016 | Esfandyarpour et al. |
| 2016/0363779 A1 | 12/2016 | Huang et al. |
| 2019/0187057 A1 | 6/2019 | Geng et al. |
| 2020/0108387 A1 | 4/2020 | Dong et al. |

FOREIGN PATENT DOCUMENTS

| | | |
|---|---|---|
| CN | 104297155 A | 1/2015 |
| CN | 107084964 A | 8/2017 |
| CN | 107607475 A | 1/2018 |
| CN | 108169966 A | 6/2018 |
| WO | 2017098076 A1 | 6/2017 |

OTHER PUBLICATIONS

International Search Report & Written Opinion dated Oct. 31, 2019, regarding PCT/CN2019/097908.

MICROFLUIDIC APPARATUS, AND METHOD OF DETECTING SUBSTANCE USING MICROFLUIDIC APPARATUS

CROSS-REFERENCE TO RELATED APPLICATION

This application is a national stage application under 35 U.S.C. § 371 of International Application No. PCT/CN2019/097908, filed Jul. 26, 2019, which claims priority to Chinese Patent Application No. 201810886760.5, filed Aug. 6, 2018. Each of the forgoing applications is herein incorporated by reference in its entirety for all purposes.

TECHNICAL FIELD

The present invention relates to optical technology and microfluidic technology, more particularly, to a microfluidic apparatus, and a method of detecting a substance using a microfluidic apparatus.

BACKGROUND

In present, microfluidic apparatus are widely used in physical, biological, and chemical fields for material analysis, molecular diagnostics, food quarantine, and bacterial classification.

SUMMARY

In one aspect, the present invention provides a microfluidic apparatus, comprising an electrochromic layer comprising a plurality of individually independently addressable regions; a microfluidic layer defining a microfluidic channel for allowing a microfluid to pass therethrough; and a plurality of photodetectors configured to detect light transmit through the microfluid; wherein the electrochromic layer is configured to be switched between a first state in which the plurality of individually independently addressable regions of the electrochromic layer are substantially transmissive, and a second state in which at least a first one of the plurality of individually independently addressable regions of the electrochromic layer in a region corresponding to a position of the microfluid is substantially transmissive, at least a second one of the plurality of individually independently addressable regions of the electrochromic layer outside the region corresponding to the position of the microfluid is substantially non-transmissive.

Optionally, the plurality of individually independently addressable regions of the electrochromic layer and the plurality of photodetectors constitute a plurality of detection units; and an orthographic projection of a respective one of the plurality of individually independently addressable regions of the electrochromic layer on a base substrate at least partially overlaps with orthographic projections of one or more of the plurality of photo detectors.

Optionally, a respective one of the plurality of detection units comprises a single one of the plurality of individually independently addressable regions of the electrochromic layer and a single one of the plurality of photodetectors; and an orthographic projection of the single one of the plurality of individually independently addressable regions of the electrochromic layer on the base substrate covers an orthographic projection of the single one of the plurality of photodetectors on the base substrate.

Optionally, the microfluidic apparatus further comprises a light guide plate on a side of the electrochromic layer away from the microfluidic layer; one or more light sources each configured to emit light into the light guide plate; and a light extraction layer configured to extract light in the light guide plate out of the light guide plate toward the electrochromic layer.

Optionally, the light extraction layer is an integral layer.

Optionally, the microfluidic apparatus further comprises a plurality of first thin film transistors configured to independently address the respective one of the plurality of individually independently addressable regions of the electrochromic layer.

Optionally, the microfluidic apparatus further comprises an electrode array including a plurality of discrete electrodes continuously arranged on a base substrate, and configured to drive a movement of the microfluid; and an orthographic projection of a respective one of the plurality of discrete electrodes on the base substrate at least partially overlaps with orthographic projections of one or more of the plurality of photodetectors.

Optionally, an orthographic projection of a single one of the plurality of discrete electrodes on the base substrate at least partially overlaps with an orthographic projection of a single one of the plurality of photodetectors on the base substrate.

Optionally, the microfluidic apparatus further comprises a first transparent electrode on a side of the light guide plate closer to the base substrate; and a second transparent electrode on a side of the first transparent electrode closer to the base substrate; wherein the electrochromic layer is between the first transparent electrode and the second transparent electrode; and at least one of the first transparent electrode and the second transparent electrode comprises a plurality of electrode blocks respectively in regions corresponding to the plurality of individually independently addressable regions, and respectively individually independently control light transmission in the plurality of individually independently addressable regions of the electrochromic layer.

Optionally, the second transparent electrode is configured to be provided with a common voltage; and the second transparent electrode is a common electrode paired with the first transparent electrode for controlling light transmission state of the electrochromic layer, and is a common electrode paired with an electrode array comprising a plurality of discrete electrodes for driving a movement of the microfluid.

Optionally, the electrochromic layer comprises an ion storage sub-layer on a side of the first transparent electrode closer to the base substrate, and configured to store ion to keep a charge balance of the electrochromic layer; an electrolyte sub-layer on a side of the ion storage layer closer to the base substrate; and an electrochromic sub-layer on a side of the electrolyte layer closer to the base substrate, and configured to change color to transmit or block light toward the microfluidic layer.

Optionally, a respective one of the plurality of photodetectors includes a respective one of a plurality of second thin film transistors and a respective one of a plurality of semiconductor junctions electrically connected to each other.

Optionally, the microfluidic apparatus further comprises a plurality of third thin film transistors; wherein a respective one of the plurality of third thin film transistors is electrically connected to a respective one of the plurality of discrete electrodes, and configured to independently address the respective one of the plurality of discrete electrodes.

In another aspect, the present invention provides a method of detecting a microfluid using a microfluidic apparatus microfluidic apparatus, comprising controlling the microfluidic apparatus in a time-division mode, the time-division mode comprises an analyte detection mode and a microfluid position determination mode; wherein, in the microfluid position determination mode, the method comprises controlling a plurality of individually independently addressable regions of an electrochromic layer to be substantially transmissive; using a plurality of photodetectors to detect light transmitting through a microfluidic layer to obtain a plurality of light intensity signals; determining a position of the microfluid based on the plurality of light intensity signals; and wherein, in the analyte detection mode, the method comprises controlling at least a first one of the plurality of individually independently addressable regions of the electrochromic layer in a region corresponding to the position of the microfluid is substantially transmissive; controlling at least a second one of the plurality of individually independently addressable regions of the electrochromic layer outside the region corresponding to the position of the microfluid to be substantially non-transmissive; using one of the plurality of photodetectors in the region corresponding to the position of the microfluid to detect light of a selected wavelength transmitting through the at least a first one of the plurality of individually independently addressable regions of the electrochromic layer and the microfluid.

Optionally, the plurality of individually independently addressable regions of the electrochromic layer and the plurality of photodetectors constitute a plurality of detection units; and an orthographic projection of a respective one of the plurality of individually independently addressable regions of the electrochromic layer on a base substrate at least partially overlaps with orthographic projections of one or more of the plurality of photo detectors.

Optionally, a respective one of the plurality of detection units comprises a single one of the plurality of individually independently addressable regions of the electrochromic layer and a single one of the plurality of photodetectors; and an orthographic projection of the single one of the plurality of individually independently addressable regions of the electrochromic layer on the base substrate covers an orthographic projection of the single one of the plurality of photodetectors on the base substrate.

Optionally, the method further comprises a light source emitting light into a light guide plate; and extracting light in the light guide plate out of the light guide plate toward the electrochromic layer using a light extraction layer.

Optionally, the method further comprises addressing a respective one of the plurality of individually independently addressable regions of the electrochromic layer using a respective one of the plurality of first thin film transistors.

Optionally, the method further comprises driving a movement of the microfluid using an electrode array including a plurality of discrete electrodes continuously arranged on a base substrate; wherein an orthographic projection of a respective one of the plurality of discrete electrodes on the base substrate at least partially overlaps with orthographic projections of one or more of the plurality of photodetectors.

Optionally, an orthographic projection of a single one of the plurality of discrete electrodes on the base substrate at least partially overlaps with an orthographic projection of a single one of the plurality of photodetectors on the base substrate.

Optionally, the method further comprises providing light to the plurality of photodetectors through the light guide plate and the plurality of individually independently addressable regions of the electrochromic layer in the microfluid position determination mode using a first light source of a first wavelength range; and providing light to one of the plurality of photodetectors in the region corresponding to the position of the microfluid through the light guide plate and the at least the first one of the plurality of individually independently addressable regions of the electrochromic layer in the analyte detection mode using a second light source of a second wavelength range; wherein the first wavelength range is different from the second wavelength range.

BRIEF DESCRIPTION OF THE FIGURES

The following drawings are merely examples for illustrative purposes according to various disclosed embodiments and are not intended to limit the scope of the present invention.

DETAILED DESCRIPTION

Figure 1:
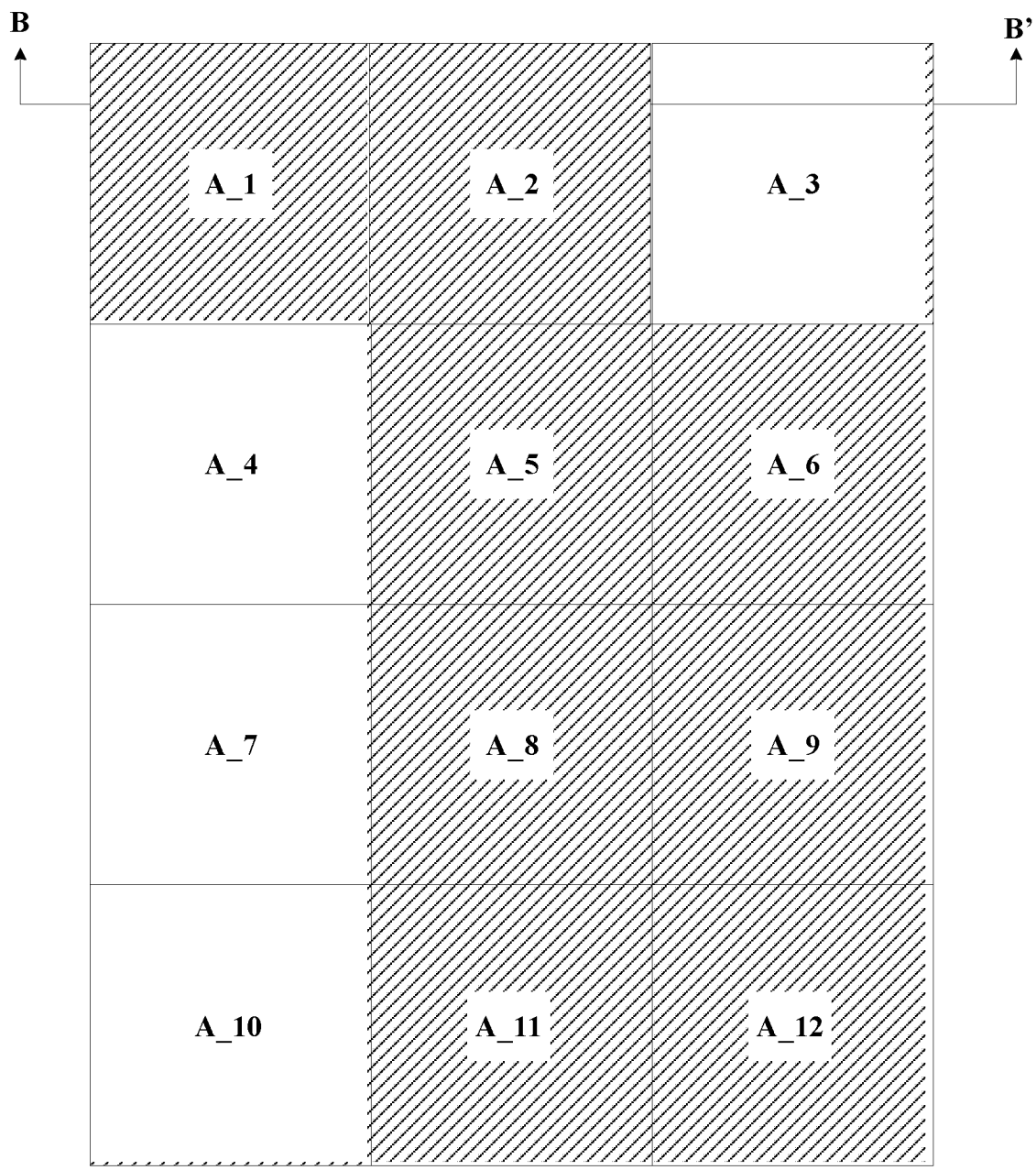
FIG. 1 is a plan view of a structure of a microfluidic apparatus in some embodiments according to the present disclosure.

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Using a microfluidic apparatus to detect a substance requires that the substance is be put in a specific detection position of the apparatus, and that light transmitting through the substance is strong enough, therefore the route of light should be designed for the light to reach the specific detection position. Because the specific detection position is not moveable, it is inconvenient to move the substance to the specific detection position to perform a detection using the microfluidic apparatus.

Accordingly, the present disclosure provides, inter alia, a microfluidic apparatus, and a method of detecting a substance using a microfluidic apparatus that substantially obviate one or more of the problems due to limitations and disadvantages of the related art. In one aspect, the present disclosure provides a microfluidic apparatus having an analyte detection mode and a microfluid position determination mode. In some embodiments, the microfluidic apparatus having the analyte detection mode and the microfluid position determination mode includes an electrochromic layer including a plurality of individually independently addressable regions; a microfluidic layer defining a microfluidic channel for allowing a microfluid to pass therethrough; and a plurality of photodetectors configured to detect light transmit through the microfluid. Optionally, in the microfluid position determination mode, the plurality of individually independently addressable regions of the electrochromic layer are substantially transmissive, the plurality of photodetectors detects light transmitting through the microfluidic layer to obtain a plurality of light intensity signals, thereby determining a position of the microfluid. Optionally, in the analyte detection mode, at least a first one of the plurality of individually independently addressable regions of the electrochromic layer in a region corresponding to the position of the microfluid is substantially transmissive, at least a second one of the plurality of individually independently addressable regions of the electrochromic layer outside the region corresponding to the position of the microfluid is substantially non-transmissive, one of the plurality of photodetectors in the region corresponding to the position of the microfluid detects light of a selected wavelength transmitting through the at least the first one of the plurality of individually independently addressable regions of the electrochromic layer and the microfluid.

As used herein, the term "substantially transparent" means at least 50 percent (e.g., at least 60 percent, at least 70 percent, at least 80 percent, at least 90 percent, and at least 95 percent) of an incident light transmitted therethrough. Optionally, the respective one of the plurality of individually independently addressable regions of the electrochromic layer is substantially transmissive refers to at least 50 percent (e.g., at least 60 percent, at least 70 percent, at least 80 percent, at least 90 percent, and at least 95 percent) of an incident light transmitted through the respective one of the plurality of individually independently addressable regions of the electrochromic layer.

As used herein, the term "non-substantially transparent" means no more than 50 percent (e.g., no more than 50 percent, no more than 40 percent, no more than 30 percent, no more than 20 percent, no more than 10 percent, and 0 percent) of an incident light transmitted therethrough. Optionally, the at least the second one of the plurality of individually independently addressable regions of the electrochromic layer outside the region corresponding to the position of the microfluid is substantially non-transmissive refers to no more than 50 percent (e.g., no more than 50 percent, no more than 40 percent, no more than 30 percent, no more than 20 percent, no more than 10 percent, and 0 percent) of an incident light transmitted through the at least second one of the plurality of individually independently addressable regions of the electrochromic layer.

FIG. 1 is a plan view of a structure of a microfluidic apparatus in some embodiments according to the present disclosure. Referring to FIG. 1, in some embodiments, the microfluidic apparatus includes a plurality of detection units $A\_n$ ($1 \leq n \leq N$, n is an integral). Referring to FIG. 1, the number of the plurality of detection units $A\_n$ is 12.

In some embodiments, a respective one of the plurality of detection units $A\_n$ includes a single one of the plurality of individually independently addressable regions of the electrochromic layer, and a single one of the plurality of photodetectors.

In some embodiments, the respective one of the plurality of detection units $A\_n$ includes multiple individually independently addressable regions of the plurality of individually independently addressable regions of the electrochromic layer, and a single one of the plurality of photodetectors.

In some embodiments, the respective one of the plurality of detection units $A\_n$ includes a single one of the plurality of individually independently addressable regions of the electrochromic layer, and multiple detectors of the plurality of photodetectors.

In some embodiments, the respective one of the plurality of detection units $A\_n$ includes multiple individually independently addressable regions of the plurality of individually independently addressable regions of the electrochromic layer, and multiple photodetectors of the plurality of photodetectors.

Figure 2:
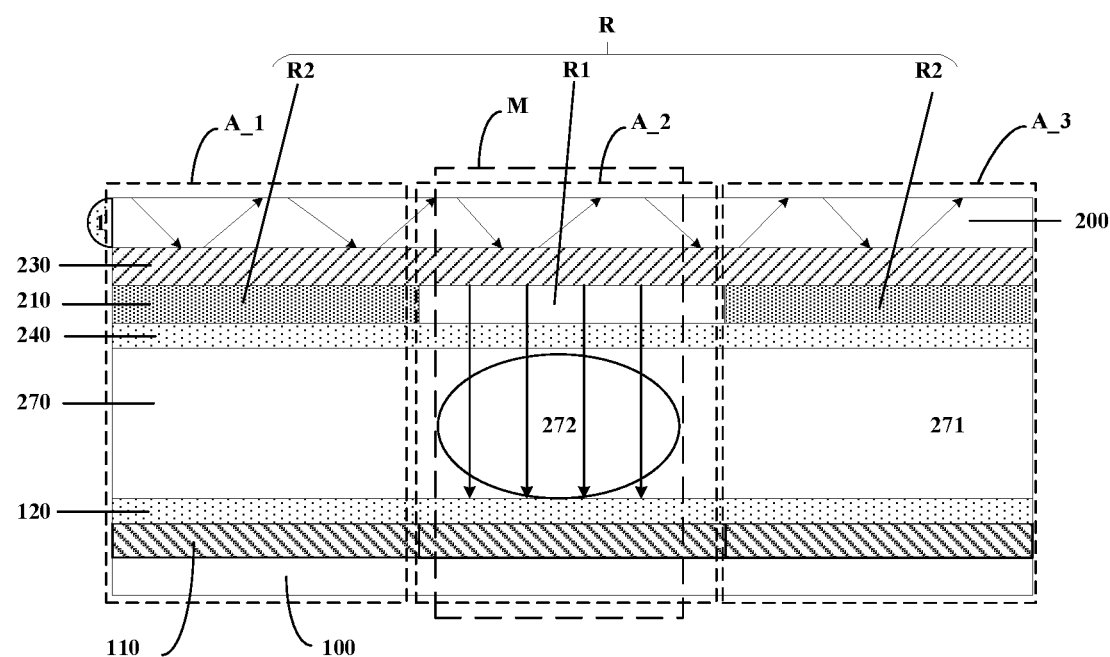
FIG. 2 is a cross-sectional view of a microfluidic apparatus along a BB' direction of FIG. 1.

FIG. 2 is a cross-sectional view of a microfluidic apparatus along a BB' direction of FIG. 1. Referring to FIG. 2, in some embodiments, the microfluidic apparatus includes the electrochromic layer 210 having the plurality of individually independently addressable regions R; a microfluidic layer 270 defining a microfluidic channel 271 for allowing a microfluid 272 to pass therethrough; and a plurality of photodetectors 110 configured to detect light transmitting through the microfluid 272.

In some embodiments, in the microfluid position determination mode, the plurality of individually independently addressable regions R of the electrochromic layer 210 are substantially transmissive. Optionally, the plurality of photodetectors 110 detect light transmitting through the microfluidic layer 270 to obtain a plurality of light intensity signals to determine a position of the microfluid 272.

In some embodiments, in the analyte detection mode, at least a first one R1 of the plurality of individually independently addressable regions R of the electrochromic layer 210 in a region M corresponding to the position of the microfluid 272 is substantially transmissive. Optionally, at least a second one R2 of the plurality of individually independently addressable regions R of the electrochromic layer 210 outside the region M corresponding to the position of the microfluid 272 is substantially non-transmissive. Optionally, one of the plurality of photodetectors 110 in the region M corresponding to the position of the microfluid 272 detects light of a selected wavelength transmitting through the at least the first one R1 of the plurality of individually independently addressable regions R of the electrochromic layer 210 and the microfluid 272.

For example, the region M corresponding to the position of the microfluidic 272 refers to that an orthographic projection of region M on the base substrate 100 covers an orthographic projection of the position of the microfluidic 272 on the base substrate 100.

For example, the at least the first one R1 of the plurality of individually independently addressable regions R of the electrochromic layer 210 in the region M corresponding to the position of the microfluid 272 refers to that an orthographic projection of the at least the first one R1 of the plurality of individually independently addressable regions R on a base substrate 100 at least partially overlaps with an orthographic projection of the region M corresponding to the position of the microfluid 272 on the base substrate 100.

For example, the at least the second one R2 of the plurality of individually independently addressable regions R of the electrochromic layer 210 outside the region M corresponding to the position of the microfluid 272 refers to that an orthographic projection of the at least the second one R2 of the plurality of individually independently addressable regions R of the electrochromic layer 210 on the base substrate 100 does not overlap with an orthographic projection of the region M corresponding to the position of the microfluid 272 on the base substrate 100.

Optionally, the microfluid 272 is a continuous microfluidic flow at a nano-scale or a micron-scale. Optionally, the microfluid 272 is a microfluidic droplet.

In some embodiments, the plurality of individually independently addressable regions R of the electrochromic layer 210 and the plurality of photodetectors 110 constitute a plurality of detection units A_n. Optionally, an orthographic projection of the respective one of the plurality of individually independently addressable regions R of the electrochromic layer 210 on the base substrate 100 at least partially overlaps with orthographic projections of one or more of the plurality of photodetectors 110.

Optionally, a respective one of the plurality of detection units A_n includes a single one of the plurality of individually independently addressable regions R of the electrochromic layer 210 and a single one of the plurality of photodetectors 110. So, the respective one of the plurality of detection units A_n includes no more than one of the plurality of individually independently addressable regions R of the electrochromic layer 210 and no more than one of the plurality of photodetectors 110.

Optionally, an orthographic projection of the single one of the plurality of individually independently addressable regions R of the electrochromic layer 210 on the base substrate 100 covers an orthographic projection of the single one of the plurality of photodetectors 110 on the base substrate 100. So, an orthographic projection of the no more than one of the plurality of individually independently addressable regions R of the electrochromic layer 210 on the base substrate 100 covers an orthographic projection of the no more than one of the plurality of photodetectors 110 on the base substrate 100.

In some embodiments, the microfluidic apparatus further includes a light guide plate 200 on a side of the electrochromic layer 210 away from the microfluidic layer 270.

In some embodiments, each of one or more light sources 1 is configured to emit light into the light guide plate 200.

Optionally, the one or more light sources 1 include a plurality of light sources of different wavelengths respectively optically coupled to the light guide plate 200. Optionally, the plurality of light sources of different wavelengths includes a first light source of a first wavelength range configured to provide light to the plurality of photodetectors 110 through the light guide plate 200 and the plurality of individually independently addressable regions R of the electrochromic layer 210 in the microfluid position determination mode; and a second light source of a second wavelength range configured to provide light to one of the plurality of photodetectors 110 in the region corresponding to the position of the microfluid 272 through the light guide plate 200 and the at least the first one R1 of the plurality of individually independently addressable regions R of the electrochromic layer 210 in the analyte detection mode. Optionally, the first wavelength range is different from the second wavelength range.

In some embodiments, a light extraction layer 230 is configured to extract light in the light guide plate 200 out of the light guide plate 200 toward the electrochromic layer 210. So, more light may irradiate at the microfluid 272. Optionally, the light extraction layer 230 is a grating.

In one example, the light extraction layer 230 is an integral layer. In another example, the light extraction layer 230 includes a plurality of light extraction blocks. For example, a respective one of the plurality of light extraction blocks is optically coupled to the respective one of the plurality of individually independently addressable regions R of the electrochromic layer 210. An orthographic projection of respective one of the plurality of light extraction blocks on the base substrate 1 covers the orthographic projection of the respective one of the plurality of individually independently addressable regions R of the electrochromic layer 210.

In some embodiments, the base substrate 100 and the light guide plate 200 are opposite to each other. Optionally, an electrochromic layer 210 is on a side of the light guide plate 200 closer to the base substrate 100. Optionally, the plurality of photodetectors 110 is on a side of the base substrate 100 closer to the light guide plate 200. Optionally, the microfluidic layer 270 is between the electrochromic layer 210 and the plurality of photodetectors 110. Optionally, the light extraction layer 230 is between the light guide plate 200 and the electrochromic layer 210.

In the microfluid position determination mode, the microfluid 272 may refract or diffract light irradiated on it, so the light intensity of light transmitting through the microfluidic 272 and subsequently reaching the one of the plurality of photodetectors 110 is different from a reference light intensity. The number of photoelectrons produced by a semiconductor layer of the one of the plurality of photodetectors 110 is different based on light having different light intensity irradiating the semiconductor layer. So, the plurality of photodetectors 110 detect light transmitting through the microfluidic layer 270 to obtain the plurality of light intensity signals to determining the position of the microfluid 272.

Optionally, the reference light intensity is an initial light intensity of light transmitting through the at least the first one R1 of the plurality of individually independently addressable regions R of the electrochromic layer 210 in the region M corresponding to the position of the microfluid 272. Optionally, the reference light intensity is a light intensity of light transmitting through the at least the second one R2 of the plurality of individually independently addressable regions R of the electrochromic layer 210 outside the region M corresponding to the position of the microfluid 272.

In the analyte detection mode, the at least the first one R1 of the plurality of individually independently addressable regions R of the electrochromic layer 210 in the region M corresponding to the position of the microfluid 272 can be controlled to be substantially transmissive. And the at least the second one R2 of the plurality of individually independently addressable regions R of the electrochromic layer 210 outside the region M corresponding to the position of the microfluid 272 can be controlled to be substantially non-transmissive. This arrangement allow the microfluidic apparatus to detect the microfluid 272 in any region of the microfluidic layer 270. It is not necessary to drive the microfluid 272 to a selected position, which may improve the efficiency of detections and the accuracy of detections.

In some embodiments, prior to detecting the microfluid 272, the microfluid 272 is pre-treated by one or more processes including driving the microfluid 272, combining the microfluid 272 with other substances, and performing a reaction between the microfluid 272 and other substances. Optionally, pretreatments on the microfluid 272 are performed in the microfluidic channel 271 of the microfluidic layer 270.

In some embodiments, the microfluidic layer 270 further includes a spacer to maintain a height of the microfluidic channel 271.

Figure 3:
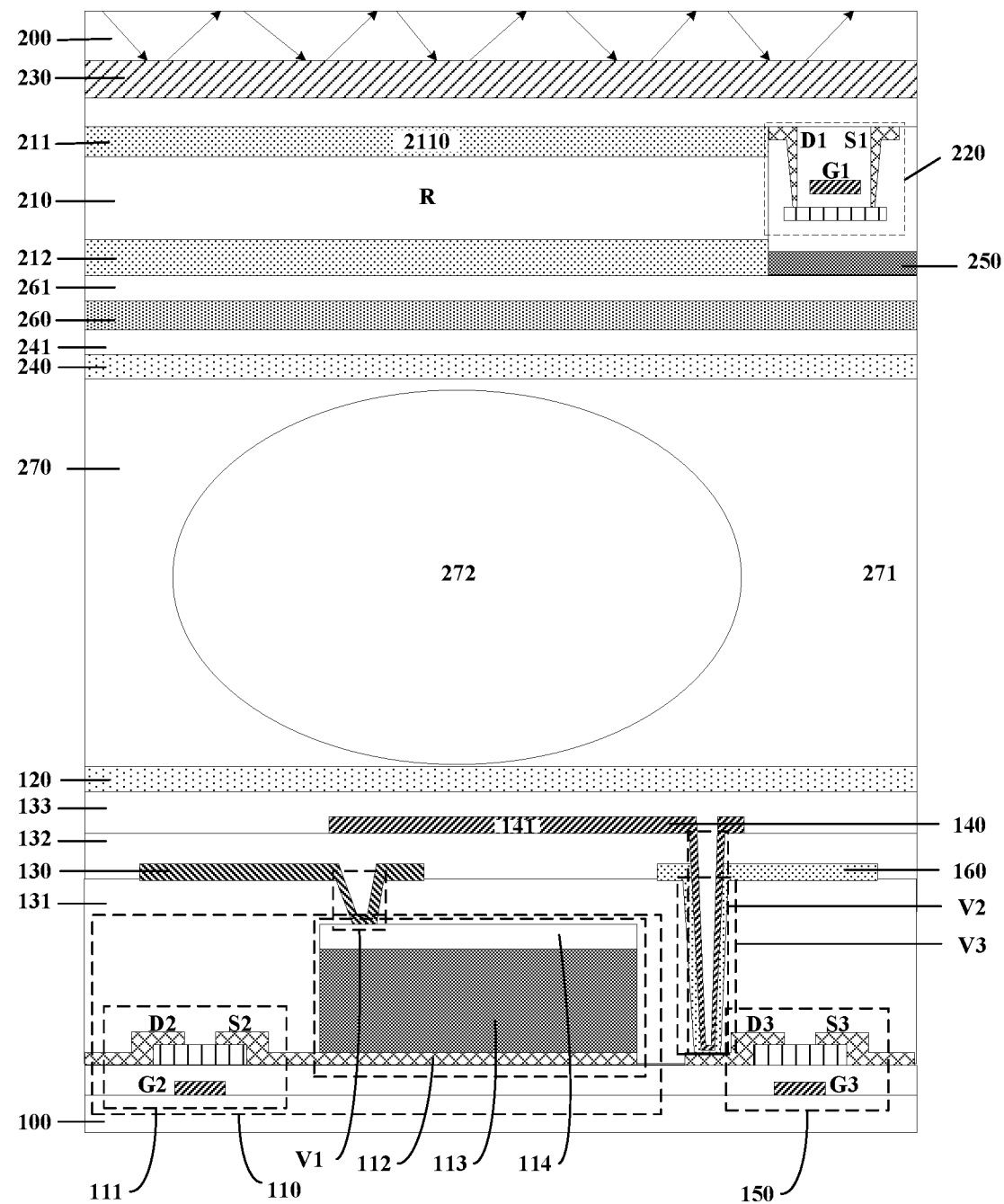
FIG. 3 is a partially cross-sectional view of a microfluidic apparatus in some embodiments according to the present disclosure.

FIG. 3 is a partially cross-sectional view of a microfluidic apparatus in some embodiments according to the present disclosure. Referring to FIG. 3, in some embodiments, the microfluidic apparatus further includes a first transparent electrode 211 on the side of the light guide plate 200 closer to the base substrate 100; a second transparent electrode 212 on a side of the first transparent electrode 211 closer to the base substrate 100; and the electrochromic layer 210 is between the first transparent electrode 211 and the second transparent electrode 212.

Optionally, at least one of the first transparent electrode 211 and the second transparent electrode 213 includes a plurality of transparent blocks.

Optionally, the second transparent electrode 212 is a common electrode. For example, the second transparent electrode 212 is an integral layer. And the first transparent electrode 211 includes a plurality of first transparent blocks 2110.

For example, a respective one of the plurality of first transparent blocks 2110 is configured to individually independently address the respective one of the plurality of individually independently addressable regions R of the electrochromic layer 210. Optionally, an orthographic projection of the respective one of the plurality of first transparent blocks 2110 covers the orthographic projection of the respective one of the plurality of individually independently addressable regions R of the electrochromic layer 210.

Figure 4A:
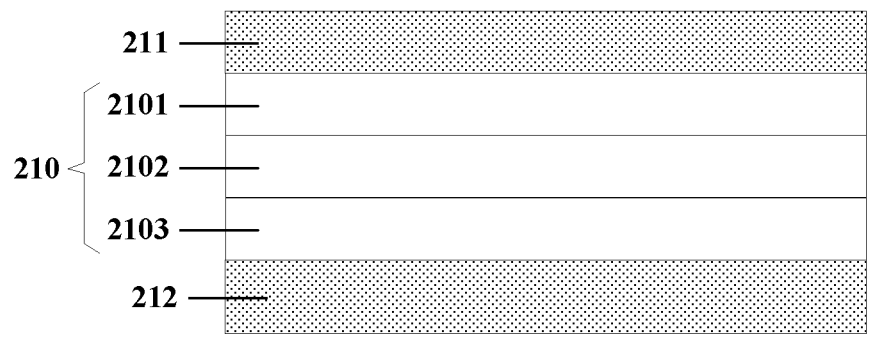
FIG. 4A is a cross-sectional view of an electrochromic layer, a first transparent electrode, and a second transparent electrode in some embodiments according to the present disclosure.

FIG. 4A is a cross-sectional view of an electrochromic layer, a first transparent electrode, and a second transparent electrode in some embodiments according to the present disclosure. Referring to FIG. 3 and FIG. 4A, in some embodiments, the electrochromic layer 210 further includes an ion storage sub-layer 2101 on a side of the first transparent electrode 211 closer to the base substrate 100; an electrolyte sub-layer 2102 on a side of the ion storage layer 2101 closer to the base substrate 100; an electrochromic sub-layer 2103 on a side of the electrolyte layer 2102 closer to the base substrate 100.

Optionally, the electrochromic sub-layer 2103 is configured to change color to transmit or block light toward the microfluidic layer 210. For example, a voltage difference between the first transparent electrode 211 and the second transparent electrode 212 leads to a redox reaction in the electrochromic sub-layer 2103 of the electrochromic layer 210, the redox reaction results in a color change of the electrochromic sub-layer 2103 of the electrochromic layer 210.

Various appropriate materials may be used for making the electrochromic sub-layer 2103. Examples of materials suitable for making the electrochromic sub-layer 2103 include, but are not limited to anode electrochromic materials or cathode electrochromic materials.

Optionally, during the redox reaction, the ion storage sub-layer 2101 is configured to store ion to keep a charge balance of the electrochromic layer 210.

Various appropriate materials may be used for making the electrolyte sub-layer 2102. Examples of materials suitable for making the electrolyte sub-layer 2102 include, but are not limited to conductive materials, solution electrolyte materials, and solid electrolyte materials. Optionally, the solution electrolyte materials and solid electrolyte materials include one or a combination of sodium perchlorate and sodium perchlorate.

Figure 4B:
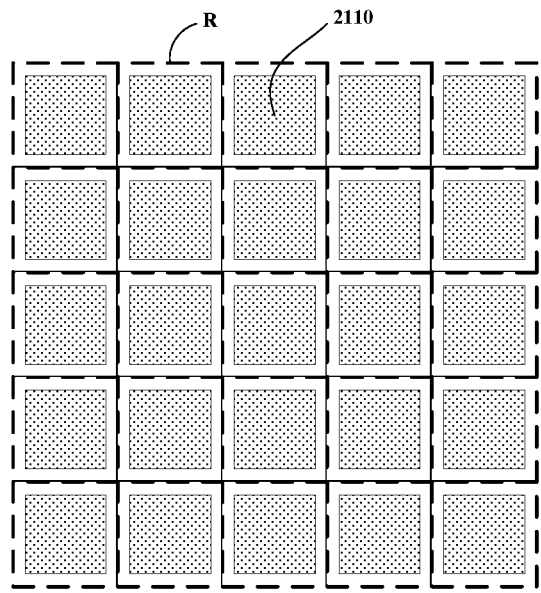
FIG. 4B is a schematic diagram illustrating the structure of a first transparent electrode in some embodiments according to the present disclosure.
Figure 4C:
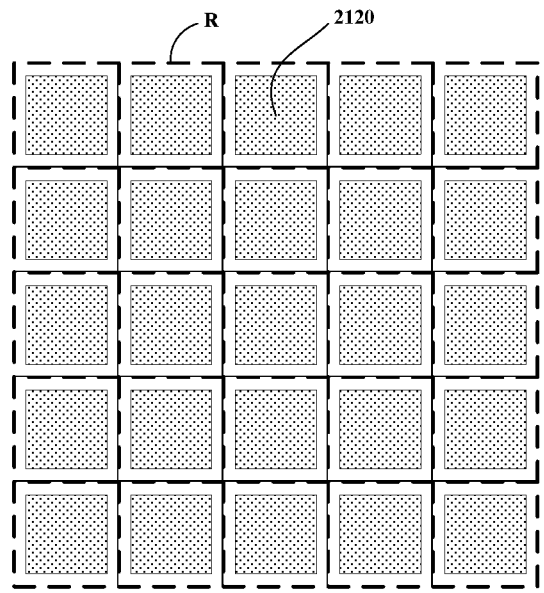
FIG. 4C is a schematic diagram illustrating the structure of a second transparent electrode in some embodiments according to the present disclosure.

FIG. 4B is a schematic diagram illustrating the structure of a first transparent electrode in some embodiments according to the present disclosure. In some embodiments, the first transparent electrode includes a plurality of first electrode blocks 2110 respectively in regions corresponding to the plurality of individually independently addressable regions R, and respectively individually independently control the plurality of individually independently addressable regions R of the electrochromic layer. FIG. 4C is a schematic diagram illustrating the structure of a second transparent electrode in some embodiments according to the present disclosure. In some embodiments, the second transparent electrode includes a plurality of second electrode blocks 2120 respectively in regions corresponding to the plurality of individually independently addressable regions R, and respectively individually independently control the plurality of individually independently addressable regions R of the electrochromic layer. In some embodiments, both the first transparent electrode and the second transparent electrode include a plurality of electrode blocks. For example, the first transparent electrode includes a plurality of first electrode blocks 2110 respectively in regions corresponding to the plurality of individually independently addressable regions R, and the second transparent electrode includes a plurality of second electrode blocks 2120 respectively in regions corresponding to the plurality of individually independently addressable regions R. A pair of a respective one of the plurality of first electrode blocks 2110 and a respective one of the plurality of second electrode blocks 2120 individually independently control light transmission in a respective one of the plurality of individually independently addressable regions R of the electrochromic layer.

Figure 5:
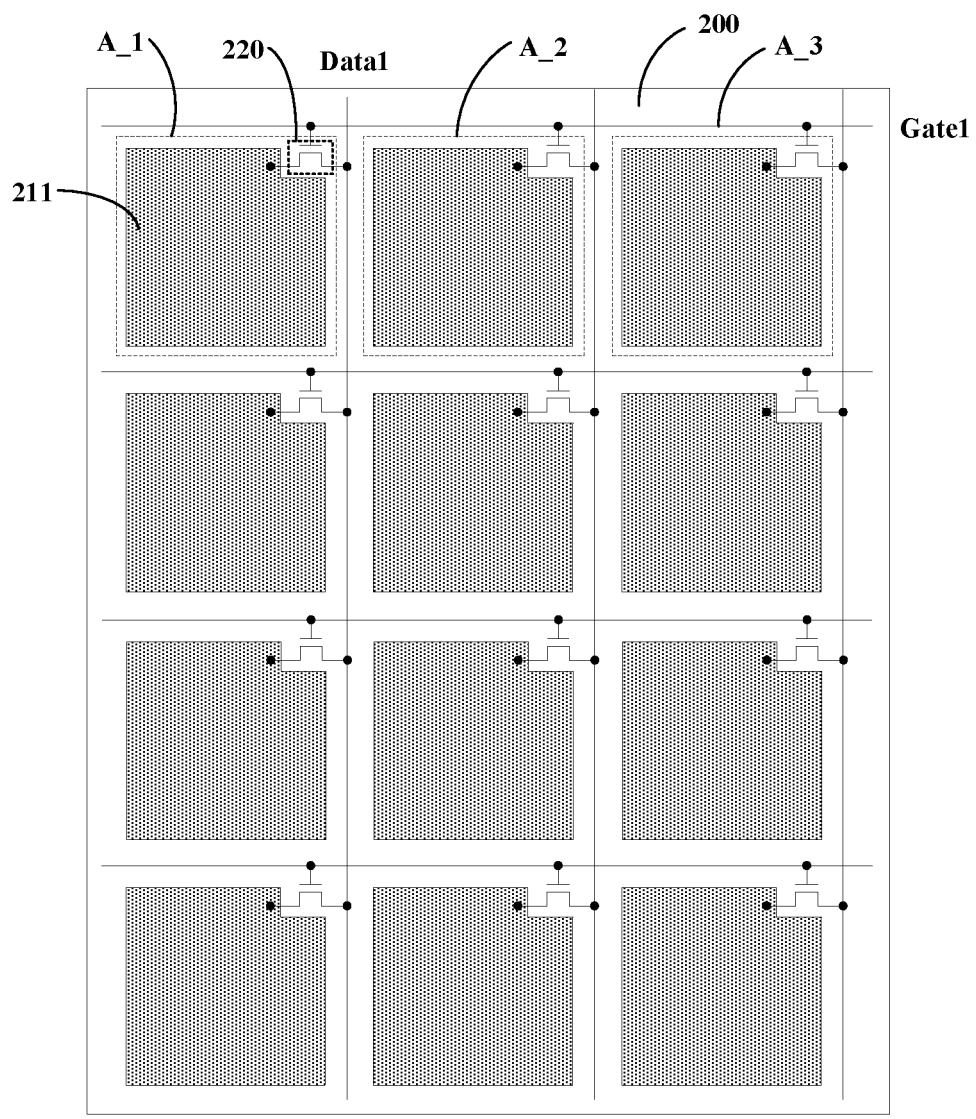
FIG. 5 is a plan view of a microfluidic apparatus along a direction from a light guide plate to a base substrate in some embodiment according to the present disclosure.

FIG. 5 is a plan view of a microfluidic apparatus along a direction from a light guide plate to a base substrate in some embodiment according to the present disclosure. Referring to FIG. 5, in some embodiments, the microfluidic apparatus further includes a plurality of first thin film transistors 220. Optionally, a respective one of the plurality of first thin film transistors 220 configured to independently address the respective one of the plurality of individually independently addressable regions R of the electrochromic layer 210.

Optionally, the respective one of the plurality of first thin film transistors 220 is a top gate thin film transistor. Optionally, the respective one of the plurality of first thin film transistors 220 is a bottom gate thin film transistor.

In some embodiments, the microfluidic apparatus includes a plurality of first data lines Data1, and a plurality of first gate lines Gate 1 on the side of the light guide plate 200 closer to the base substrate 100.

Optionally, the plurality of first thin film transistors 220 are arranged in array. Optionally, first thin film transistors 220 in a same row of the plurality of first thin film transistors 220 are electrically connected to one of the plurality of first gate lines Gate1. Optionally, first thin film transistors 220 in a same column of the plurality of first thin film transistors 220 are electrically connected to one of the plurality of first data lines Data1.

Optionally, referring to both FIG. 3 and FIG. 5, a first gate electrode G1 of the respective one of the plurality of first thin film transistors 220 is electrically connected to one of the plurality of first gate line Gate1.

Optionally, a first source electrode S1 of the respective one of the plurality of first thin film transistors 220 is electrically connected to one of the plurality of first data lines Data1.

Optionally, a first drain electrode D1 of the respective one of the plurality of first thin film transistors 220 is electrically connected to the respective one of the plurality of first transparent blocks 2110. So, the respective one of the plurality of first transparent blocks 2110 is individually independently addressed by the respective one of the plurality of first thin film transistors 220, and the respective one of the plurality of individually independently addressable regions R of the electrochromic layer 210 is individually independently addressed by the respective one of the plurality of first transparent blocks 2110 of the first transparent electrode 211.

In some embodiments, referring to FIG. 3, the microfluidic apparatus further includes a common line 250 on the side of the light guide plate 200 closer to the base substrate 100. Optionally, the common line 250 is on a side of the plurality of first thin film transistors 200.

Optionally, the second transparent electrode 212 is electrically connected to the first common line 250. Optionally, the first common line 250 are spaced apart from the plurality of first data lines Data1 and the plurality of first gate lines Gate1. Optionally, the first common line 250 is provided with a common voltage (e.g., a ground voltage).

In the microfluid position determination mode, referring to FIG. 3 and FIG. 5, in order to control the respective one of the plurality of individually independently addressable regions R of the electrochromic layer 210 to be substantially transmissive, a turn-on signal is provided to the respective one of the plurality of first thin film transistors 220 through the one of the plurality of first gate lines Gate1, so the respective one of the plurality of first thin film transistors 220 is turned on. The respective one of the plurality of first transparent blocks 2110 of the first transparent electrode 211 is provided with a first voltage by the respective one of the plurality of first thin film transistors 220. The second transparent electrode 212 is provided with a ground voltage by the first common line 250. So, a first voltage difference between the first voltage of the respective one of the plurality of first transparent blocks 2110 of the first transparent electrode 211 and the ground voltage of the second transparent electrode 212 is formed, the redox reaction is performed on the electrochromic layer 210 under the first voltage difference, to change the color and a transmittance of the electrochromic layer 210. Optionally, the respective one of the plurality of individually independently addressable regions R of the electrochromic layer 210 becomes substantially transparent to allow light to transmit therethrough and to irradiate on the microfluid 272.

Optionally, multiple individually independently addressable regions of the plurality of individually independently addressable regions R of the electrochromic layer 210 are controlled to become substantially transparent in the microfluid position determination mode. Optionally, all of the plurality of individually independently addressable regions R of the electrochromic layer 210 are controlled to become substantially transparent in the microfluid position determination mode.

In the analyte detection mode, referring to FIG. 2, FIG. 3, and FIG. 5, in some embodiments, in order to control the at least the second one R2 of the plurality of individually independently addressable regions R of the electrochromic layer 210 outside the region M corresponding to the position of the microfluid 272 to become substantially non-transmissive, first thin film transistors corresponding to the at least the second one R2 of the plurality of individually independently addressable regions R of the electrochromic layer 210 are provided with a ground voltage. Since the second transparent electrode 212 also has a ground voltage. There is no voltage difference on the at least the second one R2 of the plurality of individually independently addressable regions R of the electrochromic layer 210, so, the at least the second one R2 of the plurality of individually independently addressable regions R of the electrochromic layer 210 become substantially non-transmissive.

Optionally, first thin film transistors corresponding to the at least the second one R2 of the plurality of individually independently addressable regions R of the electrochromic layer 210 is turned off by sending turn-off signals to first gates of the first thin film transistors corresponding to the at least the second one R2 of the plurality of individually independently addressable regions R through at least one of the plurality of gate lines Gate1. So, no voltage is provided to the first thin film transistors corresponding to the at least the second one R2 of the plurality of individually independently addressable regions R, which can not only make the at least the second one R2 of the plurality of individually independently addressable regions R substantially non-transmissive, but also reduce power consumption.

Optionally, the plurality of first thin film transistor 220 can be replaced by a plurality of first signal lines respectively electrically connected to the plurality of first transparent blocks 2110 of the first transparent electrode 211.

In one example, the first voltage is provided to the respective one of the plurality of first transparent blocks 2110 of the first transparent electrode 211 through a respective one of the plurality of first signal lines, to control the respective one of the plurality of individually independently addressable regions R of the electrochromic layer 210 to become substantially transparent.

In another example, the ground voltage is provided to the respective one of the plurality of first transparent blocks 2110 of the first transparent electrode 211 through a respective one of the plurality of first signal lines, to control the respective one of the plurality of individually independently addressable regions R of the electrochromic layer 210 to become substantially non-transparent. Optionally, no voltage is applied to both the respective one of the plurality of first transparent blocks 2110 and the second transparent electrode 212 to make the respective one of the plurality of individually independently addressable regions R of the electrochromic layer 210 to become substantially non-transparent.

In some embodiments, referring to FIG. 3 and FIG. 5, the orthographic projection of the respective one of the plurality of individually independently addressable regions R of the electrochromic layer 210 on the light guide plate 200 does not overlaps with a orthographic projection of the respective one of the plurality of first thin film transistors 220 on the light guide plate 200.

Optionally, the plurality of the first thin film transistors 200 is directly adjacent to electrochromic layer 210 to maximize an area of the electrochromic layer 210.

Figure 6A:
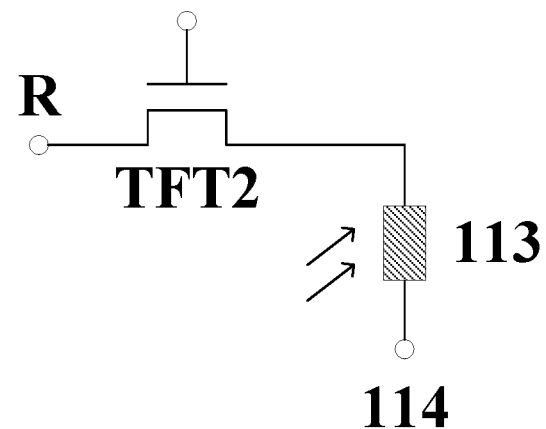
FIG. 6A is a circuit diagram of a respective one of the plurality of photodetectors in some embodiments according to the present disclosure.

FIG. 6A is a circuit diagram of a respective one of the plurality of photodetectors in some embodiments according to the present disclosure. In some embodiments, referring to FIG. 3 and FIG. 6A, a respective one of the plurality of photodetectors 110 includes a respective one of a plurality of second thin film transistors 111 and a respective one of a plurality of semiconductor junctions 113 electrically connected to each other. A second source electrode S2 of the respective one of the plurality of the second thin film transistors 111 is electrically connected to the respective one of the plurality of the semiconductor junctions 113. A second drain electrode D2 of the respective one of the plurality of second thin film transistors 111 is electrically connected to one of a plurality of read lines RL in FIG. 7 which is a plan view of a microfluidic apparatus along a direction from a base substrate to a light guide plate in some embodiments according to the present disclosure. The one of a plurality of read lines RL may in turn further connects to other components of the respective one of the plurality of photodetectors 110. The other terminal of the semiconductor junction 113 is connected to a third transparent electrode 114, which may be a common electrode configured to be provided with a common voltage (e.g., a ground voltage).

Various appropriate semiconductor junctions may be utilized in making and using the present photodetector. Examples of semiconductor junction include, but are not limited to, a PN photodiode, a PIN photodiode, an avalanche photodiode, a MIM diode junction, a MIS diode junction, a MOS diode junction, a SIS diode junction, and a MS diode junction.

Figure 6B:
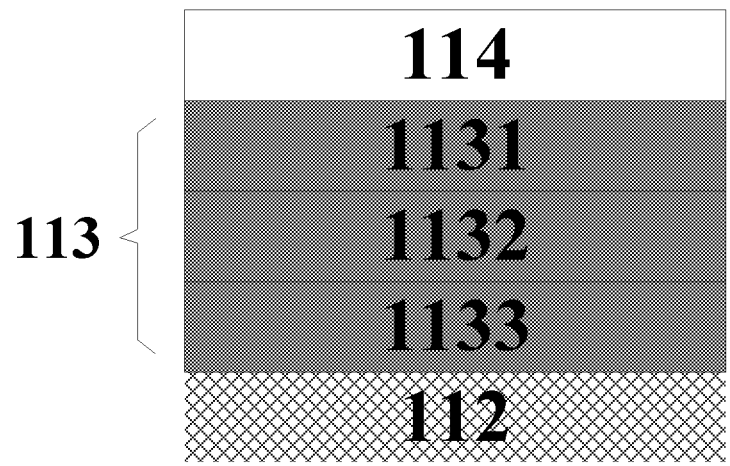
FIG. 6B is a schematic diagram illustrating the structure of a respective one of the plurality of photodetectors in some embodiments according to the present disclosure.

FIG. 6B is a schematic diagram illustrating the structure of a respective one of the plurality of photodetectors in some embodiments according to the present disclosure. Referring to FIG. 3, FIG. 6A, and FIG. 6B, the respective one of the plurality of semiconductor junctions 113 in some embodiments includes a first polarity semiconductor layer 1131 electrically connected to a third transparent electrode 114; a second polarity semiconductor layer 1133 electrically connected to a detection electrode 112, which in turn is electrically connected to a second source electrode S2 of the respective one of the plurality of second thin film transistors 111; and an intrinsic semiconductor layer 1132 connecting the first polarity semiconductor layer 1131 and the second polarity semiconductor layer 1133. As used herein, the term intrinsic semiconductor layer refers to a layer that can exhibit current rectification, e.g., a layer that exhibits drastically different conductivities in one bias direction relative to the other.

Optionally, the respective one of the plurality of photodetectors 110 having a semiconductor junction 113 includes a first polarity semiconductor layer 1131 having a first dopant, a second polarity semiconductor layer 1133 having a second dopant, and an intrinsic semiconductor layer 1132 connecting the polarity semiconductor layer 1131 and the second polarity semiconductor layer 1133. Optionally, the respective one of the plurality of photodetectors 110 having a semiconductor junction 113 is reversely biased when the first polarity semiconductor layer 1131 is connected to a low voltage and the second polarity semiconductor layer 1133 is connected to a high voltage. For example, the respective one of the plurality of photodetectors 110 having a semiconductor junction 113 is in a reversely biased state when the first polarity semiconductor layer 1131 is connected to a common electrode (e.g., the third transparent electrode 114) having low voltage, e.g., −5 V to 0 V. In some embodiments, the respective one of the plurality of photodetectors 110 having a semiconductor junction 113 is a PN junction having a P+ doping semiconductor region as the first polarity semiconductor layer 1131 and an N+ doping semiconductor region as the second polarity semiconductor layer 1133. In some embodiments, the respective one of the plurality of photodetectors 110 having a semiconductor junction 113 is a PIN photodiode having a P+ doping semiconductor region as the first polarity semiconductor layer 1131, an N+ doping semiconductor region as the second polarity semiconductor layer 1133, and an intrinsic semiconductor layer 1132 of amorphous silicon between the P+ doping semiconductor region and the N+ doping semiconductor region.

Optionally, the respective one of the plurality of photodetectors 110 is on a side of the base substrate 100 closer to the light guide plate 200.

Figure 7:
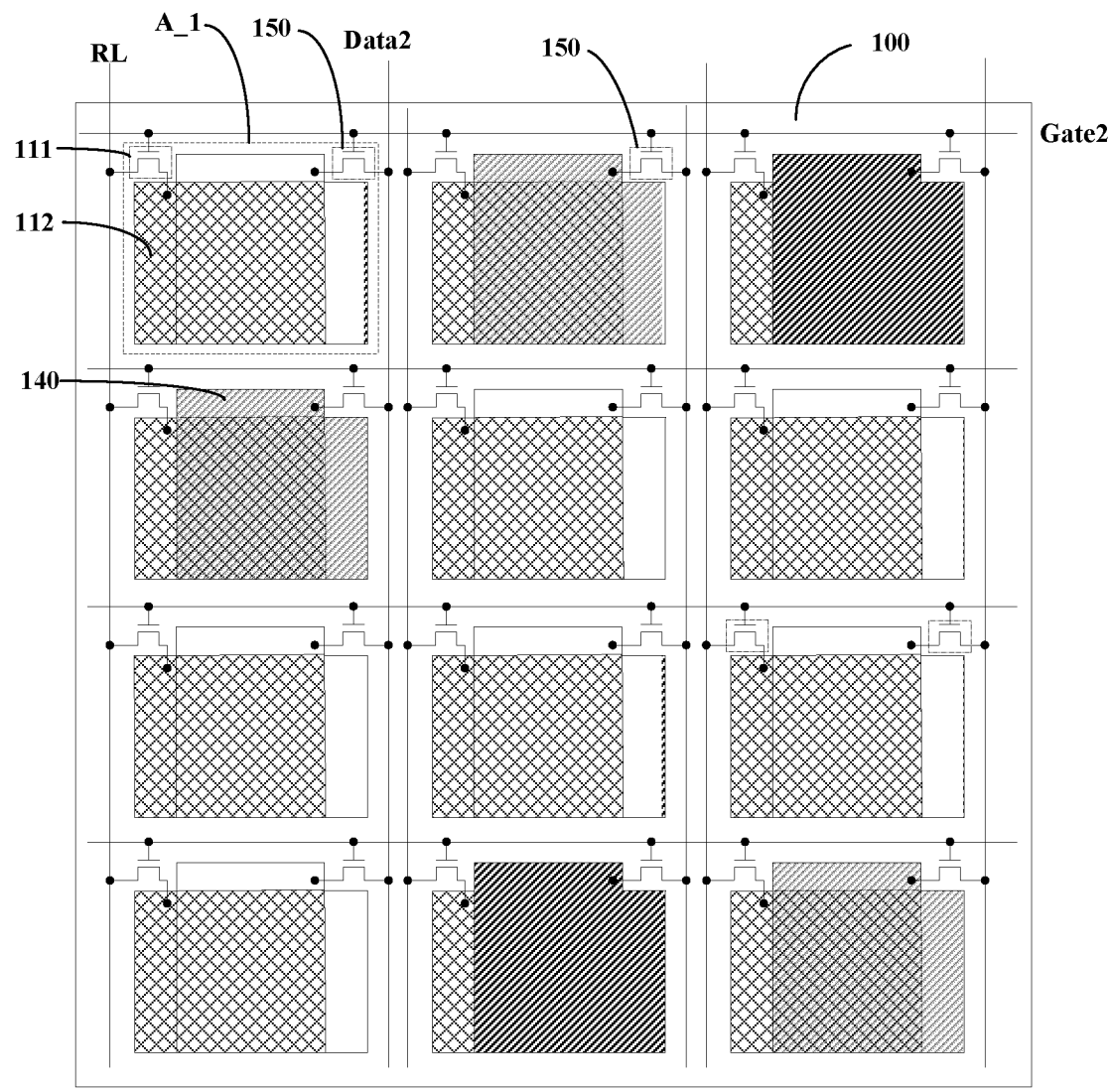
FIG. 7 is a plan view of a microfluidic apparatus along a direction from a base substrate to a light guide plate in some embodiments according to the present disclosure.

Referring to FIG. 7, in some embodiments, the microfluidic apparatus further includes the plurality of read lines RL on the side of the base substrate 100 closer to the light guide plate 200, and a plurality of second gate lines Gate2.

Referring to FIG. 3 and FIG. 7, optionally, the second gate electrode G2 of the respective one of the plurality of second thin film transistors 111 is electrically connected to one of the plurality of second Gate lines Gate2. Optionally, the second drain electrode D2 of the respective one of the plurality of second thin film transistors 111 is electrically connected to one of the plurality of read lines RL. Optionally, the second source electrode S2 of the respective one of the plurality of second thin film transistors 111 is electrically connected to the detection electrode 112.

Referring to FIG. 3, optionally, the microfluidic apparatus further includes a first insulating layer 131 on a side of the third transparent electrode 114 closer to the light guide plate 200, and a second common line 130 on a side of the first insulating layer 131 closer to the light guide plate 200. Optionally, the third transparent electrode 114 is electrically connected to the second common line 130 through a first via V1 partially extending through the first insulating layer 131 and partially exposing a surface of the third transparent electrode 114.

In the microfluid position determination mode, referring to FIG. 2, the plurality of individually independently addressable regions R of the electrochromic layer 210 are substantially transmissive, so light irradiates on the plurality of photodetectors 110. a turn-on signal is provided to the plurality of second thin film transistors 111 through a plurality of second gate lines Gate2, so the plurality of second thin film transistors 111 is turned on. For example, in the respective one of the plurality of photodetectors 110, a second voltage is provided to the third transparent electrode 114 through the second common line 130. When light irradiates on the respective one of the plurality of semiconductor junctions 113, photoelectrons are produced, the detection electrode 112 produce light intensity signals based on the photoelectron produced. Since the detection electrode 112 is electrically connected to one of the plurality of read lines RL through the respective one of the plurality of second thin film transistors 111, the plurality of read lines RL can read the plurality of light intensity signals produced by the detection electrode 112.

The number photoelectrons produced by semiconductor junctions 113 in the region M corresponding to the position of the microfluid 272 is different from the number of photoelectrons produced by semiconductor junctions outside the region M corresponding to the position of the microfluid, so a light intensity signal obtained by photodetectors in the region M corresponding to the position of the microfluid 272 is different from a light intensity signal obtained by photodetectors outside the region M corresponding to the position of the microfluid. Based on different light intensity signals obtained by different photosensors, the position of the microfluid can be determined.

Optionally, the plurality of read lines RL, the second source electrode S2 of the respective one of the plurality of the second thin film transistors 111, the second drain electrode D2 of the respective one of the plurality of the second thin film transistors 111, and the detection electrode 112 are formed in a same layer and includes a same materials, which may simplify the process of fabricating the microfluidic apparatus.

As used herein, the term "same layer" refers to the relationship between the layers simultaneously formed in the same step. In one example, the second source electrode S2 and the second drain electrode D2 are on the same layer when the two electrodes are formed as a result of one or more steps of a same patterning process performed on a same layer of material. In another example, the second source electrode S2 and the second drain electrode D2 can be formed in the same layer by simultaneously performing the step of forming the second source electrode S2 and the step of forming the second drain electrode D2. The term "same layer" does not always mean that the thickness of the layer or the height of the layer in a cross-sectional view is the same.

Optionally, the plurality of second gate lines Gate1, and second gate electrode G2 of the respective one of the plurality of second thin film transistors 111 are formed in a same layer and includes a same materials, which may simplify the process of fabricating the microfluidic apparatus.

In some embodiments, referring to FIGS. 3-7, the microfluidic apparatus further includes an electrode array 140 including a plurality of discrete electrodes 141 continuously arranged on the base substrate 100, and configured to drive a movement of the microfluid 272. Optionally, an orthographic projection of a respective one of the plurality of discrete electrodes 141 on the base substrate 100 at least partially overlaps with orthographic projections of one or more of the plurality of photodetectors 110.

Optionally, an orthographic projection of a single one of the plurality of discrete electrodes 141 on the base substrate 100 at least partially overlaps with an orthographic projection of a single one of the plurality of photodetectors 110 on the base substrate 100. Optionally, an orthographic projection of no more than one of the plurality of discrete electrodes 141 on the base substrate 100 at least partially overlaps with an orthographic projection of no more than one of the plurality of photodetectors 110 on the base substrate 100.

Optionally, the respective one of the plurality of discrete electrodes 141 is substantially transparent. Optionally, the plurality of discrete electrodes 141 are on a side of the third transparent electrode 114 closer to the light guide plate 200. Optionally, a second insulating layer 132 is between the electrode array 140 including the plurality of discrete electrodes 141 and the third transparent electrode 114, to space apart the plurality of discrete electrodes 141 and the third transparent electrode 114.

In some embodiments, the microfluidic apparatus further includes a fourth transparent electrode 260 on a side of the second transparent electrode 212 closer to the base substrate 100.

In some embodiments, the microfluidic apparatus further includes a third insulating layer 261 between the second transparent electrode 212 and the fourth transparent electrode 260, to space apart the second transparent electrode 212 and the fourth transparent electrode 260.

By applying different voltages to the electrode array 140 including the plurality of discrete electrodes 141 and the fourth transparent electrode 260, the movement of the microfluid is controlled based on the electrowetting principle.

Optionally, the microfluidic apparatus further includes a third common line on the side of the light guide plate 200 closer to the base substrate 100, and electrically connected to the fourth transparent electrode 260. Optionally, the fourth transparent electrode 260 and the third common line are in a same layer and include a same material.

Optionally, the fourth transparent electrode 260 is an integral layer. Optionally, an orthographic projection of the fourth transparent electrode 260 on the light guide plate 200 covers the light guide plate 200.

Referring to FIG. 3 and FIG. 7, in some embodiments, the microfluidic apparatus further includes a plurality of second date lines Data 2 on a side of the base substrate 100 closer to the light guide plate 200.

In some embodiments, the microfluidic apparatus further includes a plurality of third thin film transistors 150 on the side of the base substrate 100 closer to the light guide plate 200. Optionally, a respective one of the plurality of third thin film transistors 150 is electrically connected to a respective one of the plurality of discrete electrodes 141, and configured to independently address the respective one of the plurality of discrete electrodes 141.

Optionally, a third Gate electrode G3 of the respective one of the plurality of third thin film transistors 150 is electrically connected to one of the plurality of second gate lines Gate2. Optionally, a third source electrode S3 of the respective one of the plurality of third thin film transistors 150 is electrically connected to one of the plurality of second data lines Data2. Optionally, a third drain electrode D3 of the respective one of the plurality of third thin film transistors 150 is electrically connected to the respective one of the plurality of discrete electrodes 140.

For example, a common voltage is applied to the fourth transparent electrode 260 through the third common line. Turn-on signals are provided to the plurality of third thin film transistors 150 through the plurality of second gate lines Gate2, so the plurality of third thin film transistors 150 are turned on. Different voltages are applied to different discrete electrodes of the plurality of discrete electrodes 140 through the plurality of second data lines Data2. The microfluid having charges can be moved under the different voltage differences between the fourth transparent electrode 260 and different discrete electrodes of the plurality of discrete electrodes 140.

In the analyte detection mode, referring to FIG. 2, FIG. 3 and FIG. 7, based on the position of the microfluid determined in the microfluid position determination mode, the fourth transparent electrode 260 and the plurality of discrete electrodes 140 can together hold the microfluid in the same position. For example, a single one of the plurality of detection units A_n includes a single one of the plurality of second thin film transistor 111 and a single one of the plurality of third thin film transistor 150. A turn-on signal is sent to both the single one of the plurality of second thin film transistor 111 and the single one of the plurality of third thin film transistor 150 at the same time through the one of the plurality of second gate lines Gate2 to turn on both the single one of the plurality of second thin film transistor 111 and the single one of the plurality of third thin film transistor 150.

A third voltage is applied to the plurality of discrete electrodes 140 through the plurality of second data lines Date2. The third voltage is also applied to the fourth transparent electrode 260 through the third common line. No voltage difference between the plurality of discrete electrodes 140 and the fourth transparent electrode 260, the microfluid is held in the same position. Optionally, the second voltage is different from the third voltage.

Optionally, orthographic projections of the plurality of second thin film transistors 111 on the base substrate 100 does not overlap with orthographic projections of the third thin film transistors 150 on the base substrate 100. This arrangement reduces a thickness of the microfluidic apparatus.

Optionally, the third gate electrode G3 of the respective one of the plurality of third thin film transistors 150 and the second gate electrode G2 of the respective one of the plurality of second thin film transistors 111 are in a same layer, and have a same material.

Optionally, an active layer of the respective one of the plurality of third thin film transistors 150 and an active layer of the respective one of the plurality of second thin film transistors 111 are in a same layer, and have a same materials.

Optionally, the third source electrode S3 of the respective one of the plurality of third thin film transistors 150, the third drain electrode D3 of the respective one of the plurality of third thin film transistors 150, the second source electrode S2 of the respective one of the plurality of second thin film transistors 111, and the second drain electrode D2 of the respective one of the plurality of second thin film transistors 111 are in a same layer, and have a same material.

Optionally, the plurality of second thin film transistors 111 and the plurality of third thin film transistors 150 can be formed during a same process.

Optionally, the respective one of the plurality of discrete electrodes 141 is electrically connected to the respective one of the plurality of third thin film transistors 150 through a second via V2 extending through the first insulating layer 131 and the second insulating layer 132 and partially exposing a surface of the third drain electrode D3 of the respective one of the plurality of third thin film transistors 150.

In some embodiments, the microfluidic apparatus further includes a relay electrode 160. Optionally, the relay electrode 160 and the second common line 130 are in the same layer. Optionally, the relay electrode 160 is electrically connected to the third drain electrode D3 of the respective one of plurality of third thin film transistors 150 through a third via V3 extending through the first insulating layer 131 and partially exposing the surface of the third drain electrode D3 of the respective one of plurality of third thin film transistors 150. Optionally, the respective one of the plurality of discrete electrodes 141 is electrically connected to the relay electrode 160 to avoid blind via problems or buried via problems.

In some embodiments, the microfluidic apparatus further includes a first hydrophobic layer 120 on a side of the electrode array 140 including the plurality of discrete electrodes 141 closer to the light guide plate 200; and a second hydrophobic layer 240 on a side of the fourth transparent electrode 260 closer to the base substrate 100. The first hydrophobic layer 120 and the second hydrophobic layer 240 may prevent microfluid 272 from adhering to the microfluidic channel 271.

In some embodiments, the microfluidic apparatus further includes a fourth insulating layer 133 between the electrode array 140 including the plurality of discrete electrodes 141 and the first hydrophobic layer 120.

In some embodiments, the microfluidic apparatus further includes a fifth insulating layer 241 between the fourth transparent electrode 260 and the second hydrophobic layer 240.

In some embodiments, the microfluidic apparatus further includes hardware and software to perform the detection function of the microfluidic apparatus.

Figure 8:
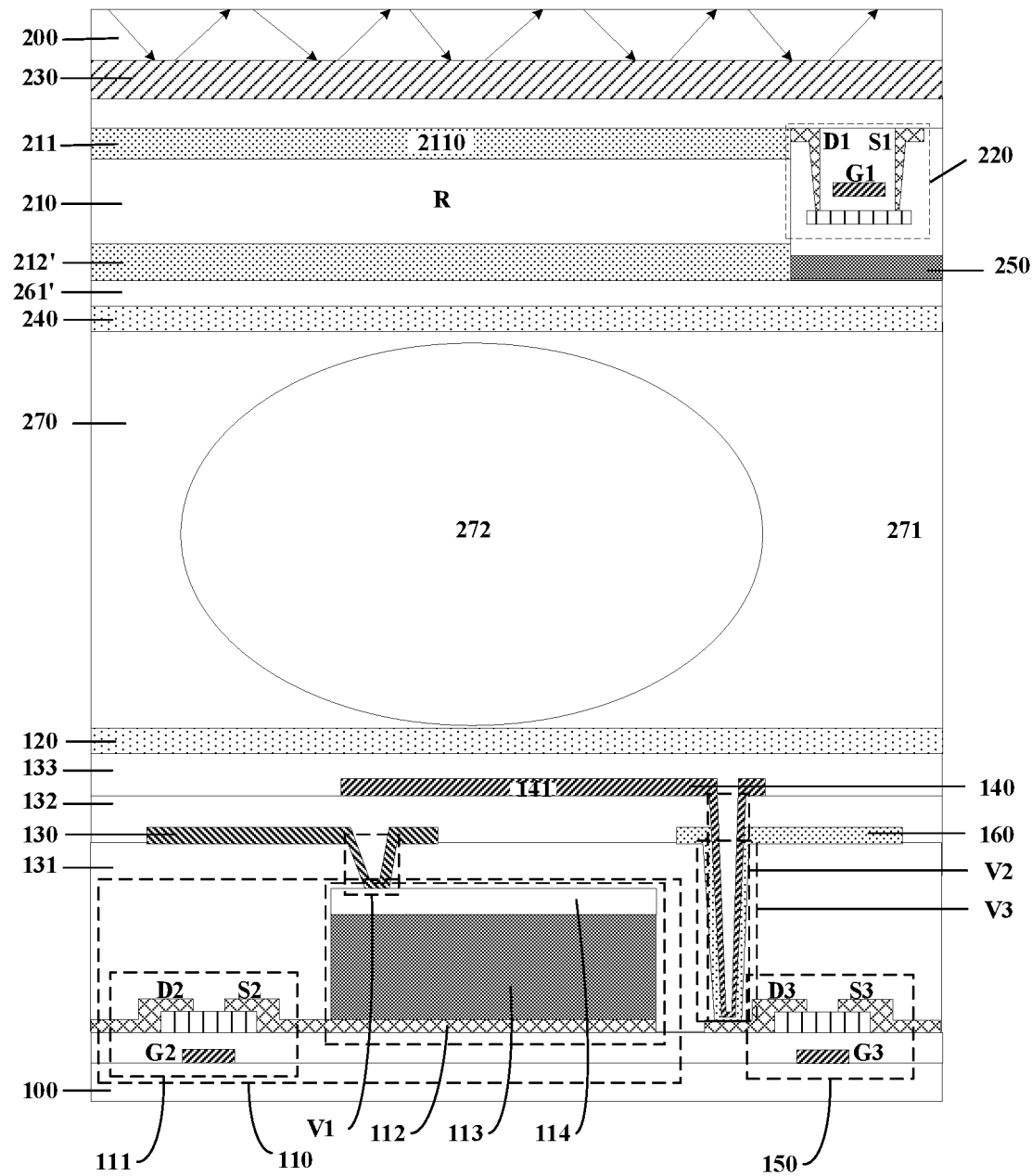
FIG. 8 is a partially cross-sectional view of a microfluidic apparatus in some embodiments according to the present disclosure.

In some embodiments, the fourth transparent electrode 260 and the second transparent electrode 212 form a unitary electrode structure. FIG. 8 is a partially cross-sectional view of a microfluidic apparatus in some embodiments according to the present disclosure. Referring to FIG. 8, a unitary transparent electrode 212' functions as a common electrode for the electrochromic layer 210 and as a common electrode for driving the microfluid droplet. The microfluidic apparatus further includes an insulating layer 261' between the unitary transparent electrode 212' and the second hydrophobic layer 240. The unitary transparent electrode 212' is a common electrode paired with the first transparent electrode 211 for controlling light transmission state of the electrochromic layer 210, and is a common electrode paired with an electrode array 140 including a plurality of discrete electrodes 141 for driving a movement of the microfluid 272.

Figure 9:
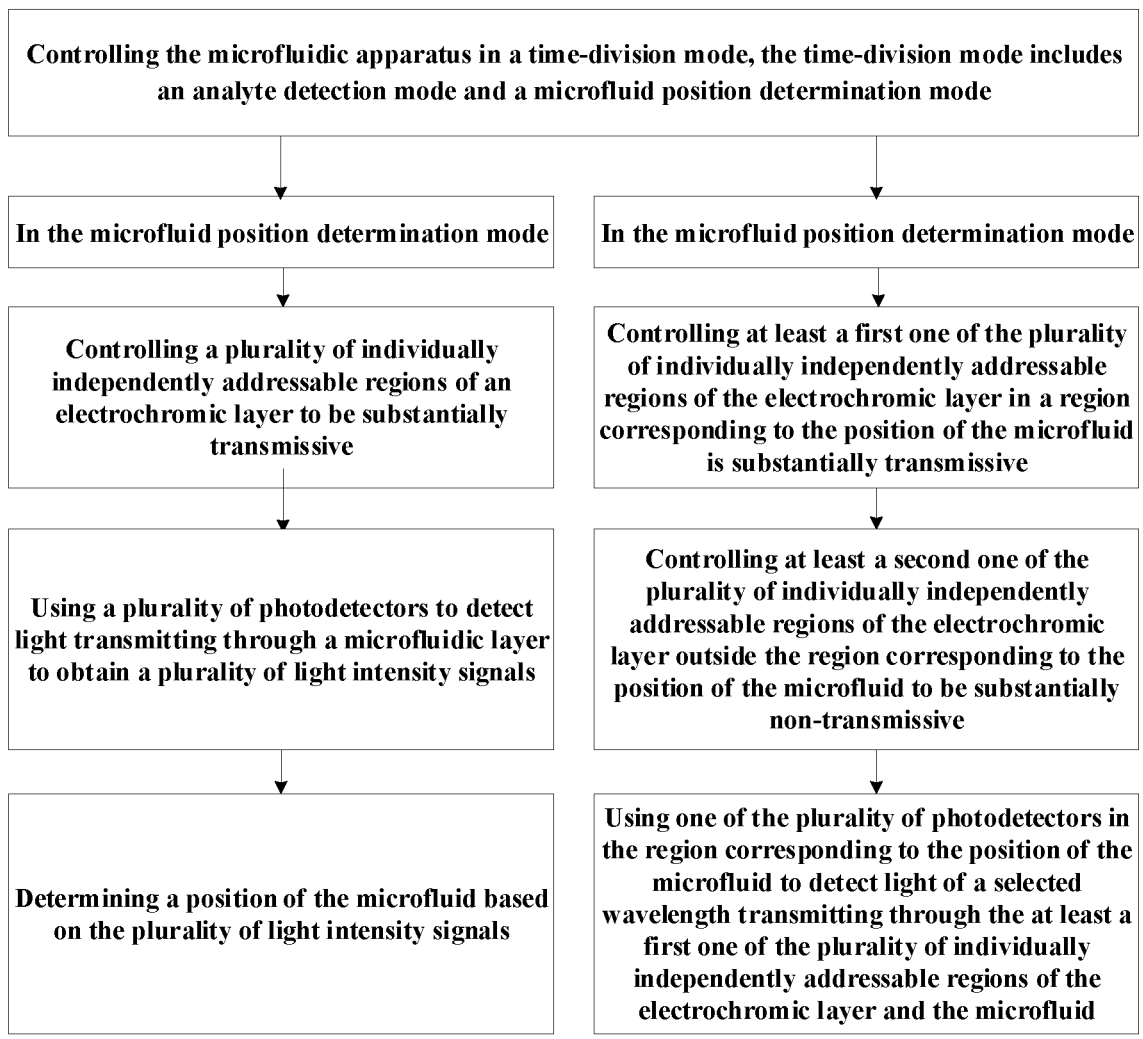
FIG. 9 is a flow chart illustrating a method of detecting a substance using a microfluidic apparatus in some embodiments according to the present disclosure.

In another aspect, the present disclosure also provides a method of detecting a substance using a microfluidic apparatus. FIG. 9 is a flow chart illustrating a method of detecting a substance using a microfluidic apparatus in some embodiments according to the present disclosure. Referring to FIG. 9, in some embodiments, the method of detecting the substance using the microfluidic apparatus includes controlling the microfluidic apparatus in a time-division mode. Optionally, the time-division mode includes an analyte detection mode and a microfluid position determination mode.

In the microfluid position determination mode, the method includes controlling a plurality of individually independently addressable regions of an electrochromic layer to be substantially transmissive; using a plurality of photodetectors to detect light transmitting through a microfluidic layer to obtain a plurality of light intensity signals, determining a position of the microfluid based on the plurality of light intensity signals.

In the analyte detection mode, the method includes controlling at least a first one of the plurality of individually independently addressable regions of the electrochromic layer in a region corresponding to the position of the microfluid is substantially transmissive; controlling at least a second one of the plurality of individually independently addressable regions of the electrochromic layer outside the region corresponding to the position of the microfluid to be substantially non-transmissive; using one of the plurality of photodetectors in the region corresponding to the position of the microfluid to detect light of a selected wavelength transmitting through the at least a first one of the plurality of individually independently addressable regions of the electrochromic layer and the microfluid.

Optionally, the plurality of individually independently addressable regions of the electrochromic layer and the plurality of photodetectors constitute a plurality of detection units. Optionally, an orthographic projection of a respective one of the plurality of individually independently addressable regions of the electrochromic layer on a base substrate at least partially overlaps with orthographic projections of one or more of the plurality of photo detectors.

Optionally, a respective one of the plurality of detection units includes a single one of the plurality of individually independently addressable regions of the electrochromic layer and a single one of the plurality of photodetectors. Optionally, an orthographic projection of the single one of the plurality of individually independently addressable regions of the electrochromic layer on the base substrate covers an orthographic projection of the single one of the plurality of photodetectors on the base substrate.

In some embodiments, the method herein further includes a light source emitting light into a light guide plate; extracting light in the light guide plate out of the light guide plate toward the electrochromic layer using a light extraction layer.

In some embodiments, the method herein further includes addressing a respective one of the plurality of individually independently addressable regions of the electrochromic layer using a respective one of the plurality of first thin film transistors.

In some embodiments, the method herein further includes driving a movement of the microfluid using an electrode array including a plurality of discrete electrodes continuously arranged on a base substrate.

Optionally, an orthographic projection of a respective one of the plurality of discrete electrodes on the base substrate at least partially overlaps with orthographic projections of one or more of the plurality of photodetectors.

Optionally, an orthographic projection of a single one of the plurality of discrete electrodes on the base substrate at least partially overlaps with an orthographic projection of a single one of the plurality of photodetectors on the base substrate.

Optionally, an orthographic projection of no more than one of the plurality of discrete electrodes on the base substrate at least partially overlaps with an orthographic projection of no more than one of the plurality of photodetectors on the base substrate.

In some embodiments, the method herein further includes providing light to the plurality of photodetectors through the light guide plate and the plurality of individually independently addressable regions of the electrochromic layer in the microfluid position determination mode using a first light source of a first wavelength range; and providing light to one of the plurality of photodetectors in the region corresponding to the position of the microfluid through the light guide plate and the at least the first one of the plurality of individually independently addressable regions of the electrochromic layer in the analyte detection mode using a second light source of a second wavelength range. Optionally, the first wavelength range is different from the second wavelength range.

In some embodiments, the microfluidic apparatus used in the method herein further includes a first transparent electrode on the side of the light guide plate closer to the base substrate; a second transparent electrode on a side of the first transparent electrode closer to the base substrate 100; and the electrochromic layer is between the first transparent electrode and the second transparent electrode.

For example, there is a voltage difference between the first transparent electrode and the second transparent electrode, the voltage difference may control the electrochromic layer to become substantially transparent in the microfluid position determination mode. Prior to the microfluid position determination mode, the electrochromic layer is substantially non-transparent, and no voltage is applied to both the first transparent electrode and the second transparent electrode.

In some embodiments, the microfluidic apparatus used in the plurality of photodetectors detects the light transmitting through a microfluidic layer to obtain a plurality of light intensity signals to determine the position of the microfluid based on the plurality of light intensity signals. At the same time, the electrode array including the plurality of discrete electrodes holds the microfluidic in the same position.

In another aspect, the present disclosure also provide a microfluidic detection system. In some embodiments, the microfluidic detection system include the microfluidic apparatus described herein.

In the microfluidic apparatus described herein, the microfluidic detection system having the microfluidic apparatus described herein, and the method using the microfluidic apparatus described herein, in the microfluid position determination mode, the microfluid may refract or diffract light irradiated on it, so the light intensity of light transmitting through the microfluidic and subsequently reaching the one of the plurality of photodetectors is different from a reference light intensity. The number of photoelectrons produced by a semiconductor layer of the one of the plurality of photodetectors is different based on light having different light intensity irradiating the semiconductor layer. So, the plurality of photodetectors detect light transmitting through the microfluidic layer to obtain the plurality of light intensity signals to determining the position of the microfluid.

Optionally, the reference light intensity is an initial light intensity of light transmitting through the at least the first one of the plurality of individually independently addressable regions of the electrochromic layer in the region corresponding to the position of the microfluid. Optionally, the reference light intensity is a light intensity of light transmitting through the at least the second one of the plurality of individually independently addressable regions of the electrochromic layer outside the region corresponding to the position of the microfluid.

In the analyte detection mode, the at least the first one of the plurality of individually independently addressable regions of the electrochromic layer in the region corresponding to the position of the microfluid can be controlled to be substantially transmissive. And the at least the second one of the plurality of individually independently addressable regions of the electrochromic layer outside the region corresponding to the position of the microfluid can be controlled to be substantially non-transmissive. This arrangement allow the microfluidic apparatus to detect the microfluid in any region of the microfluidic layer. It is not necessary to drive the microfluid to a selected position, which may improve the efficiency of detections and the accuracy of detections.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A microfluidic apparatus, comprising:
   an electrochromic layer comprising a plurality of individually independently addressable regions;
   a microfluidic layer defining a microfluidic channel for allowing a microfluid to pass therethrough; and
   a plurality of photodetectors configured to detect light transmit through the microfluid;
   wherein the electrochromic layer is configured to be switched between a first state in which the plurality of individually independently addressable regions of the electrochromic layer are substantially transmissive, and a second state in which at least a first one of the plurality of individually independently addressable regions of the electrochromic layer in a region corresponding to a position of the microfluid is substantially transmissive, at least a second one of the plurality of individually independently addressable regions of the electrochromic layer outside the region corresponding to the position of the microfluid is substantially non-transmissive.

2. The microfluidic apparatus of claim 1, wherein the plurality of individually independently addressable regions of the electrochromic layer and the plurality of photodetectors constitute a plurality of detection units; and
   an orthographic projection of a respective one of the plurality of individually independently addressable regions of the electrochromic layer on a base substrate at least partially overlaps with orthographic projections of one or more of the plurality of photodetectors.

3. The microfluidic apparatus of claim 2, wherein a respective one of the plurality of detection units comprises a single one of the plurality of individually independently addressable regions of the electrochromic layer and a single one of the plurality of photodetectors; and
   an orthographic projection of the single one of the plurality of individually independently addressable regions of the electrochromic layer on the base substrate covers an orthographic projection of the single one of the plurality of photodetectors on the base substrate.

4. The microfluidic apparatus of claim 1, further comprising a light guide plate on a side of the electrochromic layer away from the microfluidic layer;
   one or more light sources each configured to emit light into the light guide plate; and
   a light extraction layer configured to extract light in the light guide plate out of the light guide plate toward the electrochromic layer.

5. The microfluidic apparatus of claim 4, wherein the light extraction layer is an integral layer.

6. The microfluidic apparatus of claim 1, further comprising a plurality of first thin film transistors configured to independently address the respective one of the plurality of individually independently addressable regions of the electrochromic layer.

7. The microfluidic apparatus of claim 1, further comprising an electrode array including a plurality of discrete electrodes continuously arranged on a base substrate, and configured to drive a movement of the microfluid; and
   an orthographic projection of a respective one of the plurality of discrete electrodes on the base substrate at least partially overlaps with orthographic projections of one or more of the plurality of photodetectors.

8. The microfluidic apparatus of claim 7, wherein an orthographic projection of a single one of the plurality of discrete electrodes on the base substrate at least partially overlaps with an orthographic projection of a single one of the plurality of photodetectors on the base substrate.

9. The microfluidic apparatus of claim 1, further comprising:
   a first transparent electrode on a side of the light guide plate closer to the base substrate; and
   a second transparent electrode on a side of the first transparent electrode closer to the base substrate;
   wherein the electrochromic layer is between the first transparent electrode and the second transparent electrode; and
   at least one of the first transparent electrode and the second transparent electrode comprises a plurality of electrode blocks respectively in regions corresponding to the plurality of individually independently addressable regions, and respectively individually independently control light transmission in the plurality of individually independently addressable regions of the electrochromic layer.

10. The microfluidic apparatus of claim 9, wherein the second transparent electrode is configured to be provided with a common voltage; and
    the second transparent electrode is a common electrode paired with the first transparent electrode for controlling light transmission state of the electrochromic layer, and is a common electrode paired with an electrode array comprising a plurality of discrete electrodes for driving a movement of the microfluid.

11. The microfluidic apparatus of claim 1, wherein a respective one of the plurality of photodetectors includes a respective one of a plurality of second thin film transistors and a respective one of a plurality of semiconductor junctions electrically connected to each other.

12. The microfluidic apparatus of claim 1, further comprising a plurality of third thin film transistors;
    wherein a respective one of the plurality of third thin film transistors is electrically connected to a respective one of the plurality of discrete electrodes, and configured to independently address the respective one of the plurality of discrete electrodes.

13. A method of detecting a microfluid using a microfluidic apparatus microfluidic apparatus, comprising:
    controlling the microfluidic apparatus in a time-division mode, the time-division mode comprises an analyte detection mode and a microfluid position determination mode;
    wherein, in the microfluid position determination mode, the method comprises:
    controlling a plurality of individually independently addressable regions of an electrochromic layer to be substantially transmissive;
    using a plurality of photodetectors to detect light transmitting through a microfluidic layer to obtain a plurality of light intensity signals;
    determining a position of the microfluid based on the plurality of light intensity signals; and
    wherein, in the analyte detection mode, the method comprises:

controlling at least a first one of the plurality of individually independently addressable regions of the electrochromic layer in a region corresponding to the position of the microfluid is substantially transmissive;

controlling at least a second one of the plurality of individually independently addressable regions of the electrochromic layer outside the region corresponding to the position of the microfluid to be substantially non-transmissive;

using one of the plurality of photodetectors in the region corresponding to the position of the microfluid to detect light of a selected wavelength transmitting through the at least a first one of the plurality of individually independently addressable regions of the electrochromic layer and the microfluid.

14. The method of claim 13, wherein the plurality of individually independently addressable regions of the electrochromic layer and the plurality of photodetectors constitute a plurality of detection units; and an orthographic projection of a respective one of the plurality of individually independently addressable regions of the electrochromic layer on a base substrate at least partially overlaps with orthographic projections of one or more of the plurality of photodetectors.

15. The method of claim 13, wherein a respective one of the plurality of detection units comprises a single one of the plurality of individually independently addressable regions of the electrochromic layer and a single one of the plurality of photodetectors; and an orthographic projection of the single one of the plurality of individually independently addressable regions of the electrochromic layer on the base substrate covers an orthographic projection of the single one of the plurality of photodetectors on the base substrate.

16. The method of claim 13, further comprising:

a light source emitting light into a light guide plate; and extracting light in the light guide plate out of the light guide plate toward the electrochromic layer using a light extraction layer.

17. The method of claim 13, further comprising addressing a respective one of the plurality of individually independently addressable regions of the electrochromic layer using a respective one of the plurality of first thin film transistors.

18. The method of claim 13, further comprising driving a movement of the microfluid using an electrode array including a plurality of discrete electrodes continuously arranged on a base substrate;

wherein an orthographic projection of a respective one of the plurality of discrete electrodes on the base substrate at least partially overlaps with orthographic projections of one or more of the plurality of photodetectors.

19. The method of claim 13, wherein an orthographic projection of a single one of the plurality of discrete electrodes on the base substrate at least partially overlaps with an orthographic projection of a single one of the plurality of photodetectors on the base substrate.

20. The method of claim 13, further comprising providing light to the plurality of photodetectors through the light guide plate and the plurality of individually independently addressable regions of the electrochromic layer in the microfluid position determination mode using a first light source of a first wavelength range; and providing light to one of the plurality of photodetectors in the region corresponding to the position of the microfluid through the light guide plate and the at least first one of the plurality of individually independently addressable regions of the electrochromic layer in the analyte detection mode using a second light source of a second wavelength range;

wherein the first wavelength range is different from the second wavelength range.

* * * * *